United States Patent [19]  
Urban

[11] 3,767,270  
[45] Oct. 23, 1973

[54] SKID CONTROL SYSTEM  
[75] Inventor: John A. Urban, Livonia, Mich.  
[73] Assignee: Eaton Corporation, Cleveland, Ohio  
[22] Filed: Mar. 17, 1971  
[21] Appl. No.: 125,142

[52] U.S. Cl. .................. 303/21 BE, 303/7, 303/20  
[51] Int. Cl. .......... B60t 8/08, B60t 8/10, B60t 8/12  
[58] Field of Search ................. 188/181; 303/7, 9, 303/13, 20, 21; 317/5; 324/160–162; 340/52 R, 262–263

[56] References Cited  
UNITED STATES PATENTS

| 3,574,415 | 4/1971  | Stamm .......................... 303/21 EB |
| 3,482,887 | 12/1969 | Sheppard ....................... 303/21 BE |
| 3,602,553 | 8/1971  | Cumming et al. .............. 303/21 EB |
| 3,495,882 | 2/1970  | Stelzer .......................... 303/21 F  |
| 3,494,671 | 2/1970  | Slavin et al. ................... 303/21 P  |
| 3,583,773 | 6/1971  | Steinbrenner et al. ......... 303/21 EB |

FOREIGN PATENTS OR APPLICATIONS  
1,953,253  6/1970  Germany ........................ 303/21 P Primary Examiner—Milton Buchler  
Assistant Examiner—Stephen G. Kunin  
Attorney—Yount, Tarolli, Weinshenker & Cooper

[57]  ABSTRACT

A compound anti-skid logic system in which a plurality of different logic circuits are operative in parallel to process input signals from a common source in accordance with the different logic of each circuit with the different circuits complementing each other so that at least one logic circuit detects a wheel lock or an impending wheel lock under widely variable road conditions and brake application pressures. The compound system is incorporated in a master module with additional slave modules used with the master module to control axles in addition to those controlled by the master module.

7 Claims, 9 Drawing Figures

INVENTOR
JOHN A. URBAN

BY Yount and Tarolli
ATTORNEYS

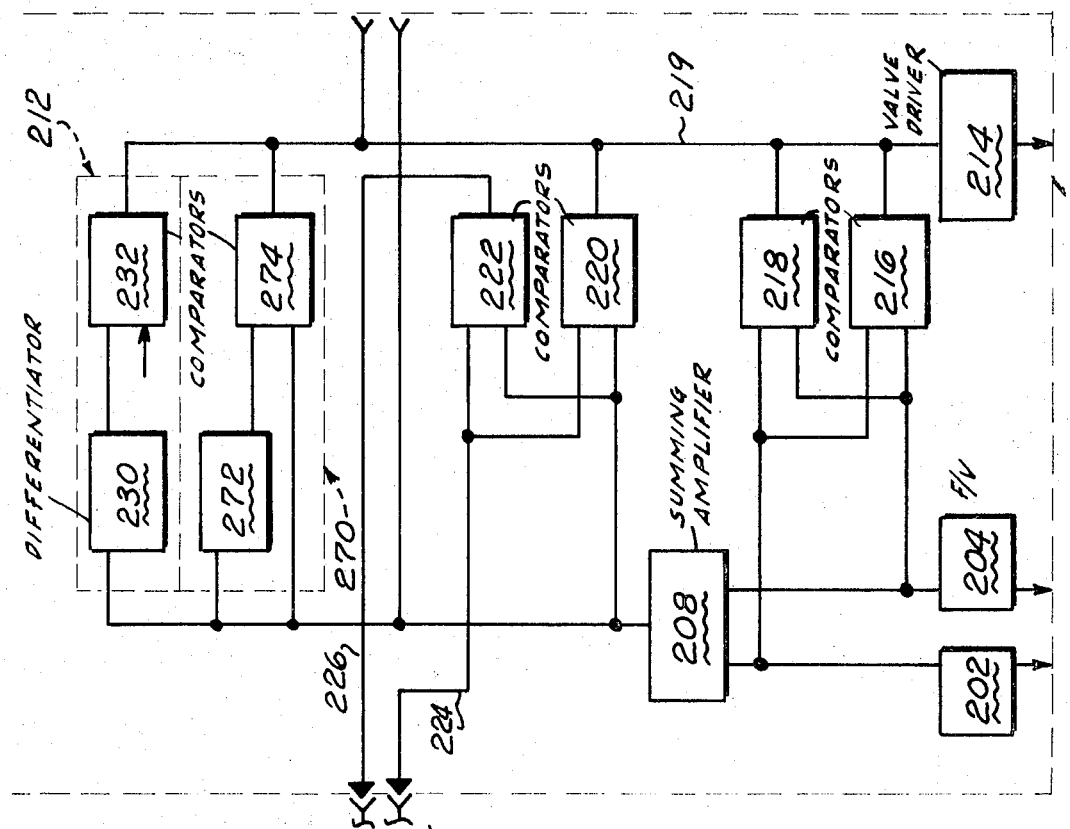
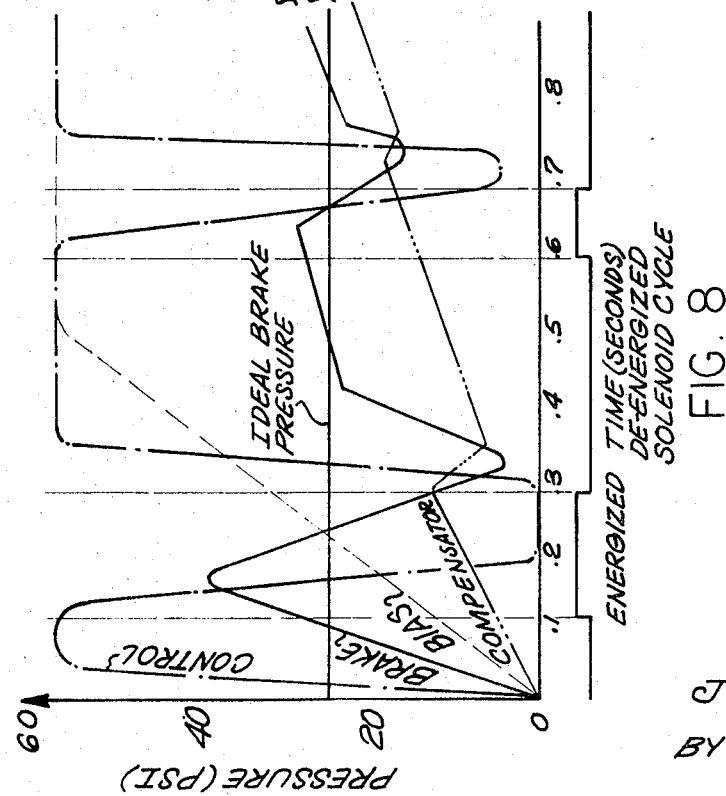
FIG. 6
FIG. 8

SKID CONTROL SYSTEM

This invention relates to a skid control system for use in controlling the brake pressure applied to the fluid pressure operated brakes of a vehicle and, more particularly, to a skid control compound logic system for use in an air operated truck brake system.

Although the invention will be described with particualr reference to an air brake system for truck tractors and trailers, it will be appreciated that the principles of the invention have broader application and may be used with other types of vehicles and in brake systems other than pneumatically actuated brake systems.

BACKGROUND OF THE INVENTION

It has long been recognized that vehicle wheel lock-up during braking produces several undesirable results among which are the increased stopping distance required to halt the vehicle, increased tire wear and loss of operator control over the direction of travel of the vehicle. To prevent the occurrence of results such as these, a wide variety of anti-skid systems have been developed for detecting wheel lock-up or impending wheel lock-up. Most, if not all, of these systems contemplate normal operator control of brake application until a locked or impending locked wheel is detected by the system and, thereafter, the system automatically operates to control braking of the vehicle until the condition which triggered the system is removed. However, as a practical matter, the prior art systems have proven less than satisfactory due to, among other reasons, the numerous variable factors which must be taken into consideration for any one system to perform satisfactorily under all possible conditions. Among these factors are the construction of the brake system, the inertia of the wheel and drive train assembly, the variable road conditions encountered, the frictional aspects of the tires, the static brake loading and the effect of weight transfers during braking.

In addition, it is highly desirable that the skid control system be sufficiently sensitive to detect impending wheel locks so that actual lock-up of the wheel can be avoided. On the other hand, nuisance actuation of the system due to normal braking and turning of the vehicle and different rolling radii of the tires must be avoided.

Another important consideration is that the integrity of the output signal from such systems should be maintained irrespective of the magnitude of the excess brake pressure applied to the brakes during a skid condition. In other words, a skid signal should be generated by the system under conditions which may range from a very small excess brake application to a very large excess brake application such as, for example, where there is a panic stop on icy roads. It is to be understood that "excess" brake pressure is always present when a skid condition occurs and it is the magnitude of the brake pressure in excess of the ideal brake pressure to which reference is made. The magnitude of this excess brake application is very small, a slow-lock may occur in which a wheel slowly decelerates to a lock-up condition without a skid control signal being produced. Some skid control systems may allow the vehicle wheels to prematurely step down to zero speed; this step-lock, as it is called, may be occasioned in some systems during small excess brake application pressure and in others during large excess brake application pressures. In other systems, a heavy excess brake application will result in a fast-lock of the wheels before the brake pressure can be relieved resulting in loss of the skid control signal.

SUMMARY OF THE INVENTION

It is a primary object of this invention to provide an improved anti-skid control system which is operative to detect a wheel lock or an impending wheel lock and generate a skid signal under virtually all operating conditions.

It is a more specific object of the invention to provide a compound anti-skid logic system in which a plurality of different logic circuits are operative in parallel to process input signals from a common source in accordance with the different logic of each circuit with the different circuits complementing each other so that at least one logic circuit detects a wheel lock or an impending wheel lock under widely variable road conditions and brake application pressure levels.

A further object of the invention is to provide a compound anti-skid logic system which includes wheel and axle speed logic, wheel and axle deceleration logic and computed wheel and axle speed logic and which are all operative to produce a skid control signal for automatically varying the brake application pressure.

Still another object of the invention is to provide a skid control system which readily lends itself to a modular system of packaging and in which a master module together with add-on slave modules may be utilized to provide skid control for multiple axle vehicles such as tractor-trailer units or the like.

In accordance with the preferred form of the invention, the skid control system comprises a master logic module which controls the brake application pressure supplied to the two wheels on an axle with the module including first logic circuit means for producing a skid signal when the two wheel speeds differ by a predetermined amount, second logic circuit means for producing a skid signal when the deceleration of either wheel exceeds a predetermined threshold value and third logic circuit means for producing a skid signal when the actual velocity of either wheel is less by a predetermined amount than the computed velocity of the wheel under predetermined assumed conditions. The input signals to each of the logic circuit means comprises first and second speed signals representative, respectively, of the two wheels on the axle. If a skid condition is detected by any one or more of the logic circuit means, a skid signal is generated to actuate a skid control valve which relieves the brake pressure and controls the subsequent application of fluid pressure to the brakes. The valve comprises a compensating relay valve which, upon actuation, rapidly vents the brake pressure and, upon relief of the skid condition, reapplies brake pressure first at a rapid rate up to a level close to but below the ideal brake pressure and thereafter at a slower rate until either the vehicle is stopped or a skid condition is again detected and the valve is recycled.

In accordance with a further aspect of the invention it is contemplated that the skid control system may be used in a two axle vehicle with the master module being associated with, for example, the steer axle of the vehicle and slave modules for controlling the brakes associated with the wheels on the other axle. The slave module receives two speed signals representative of the speeds of the two wheels with which that module is associated. These two speed signals are applied to a first logic circuit means for generating a skid signal when the two wheel speeds differ by a predetermined amount. The slave module further includes second logic circuit means for comparing the speed of the associated axle with the other axle of the vehicle and generates a skid control signal when those two speeds differ by a predetermined amount. A third logic circuit means is included in the slave module and operates to generate a skid control signal when the axle speed decreases at a rate in excess of a predetermined rate. The only input signal supplied to the first and third logic circuit means in the slave module are the wheel speed signals from the wheels of the axle associated with that module. The second logic circuit means receives axle speed signals from the master and slave modules.

This basic skid control system utilizing a master and a slave module may be expanded by additional slave modules for each axle of the vehicle with each additional slave module receiving an axle speed signal from the preceding slave module whereby a vehicle having almost any combination of axles can be controlled.

Other objects, features and advantages of the invention will be more apparent from the following description which, together with the attached drawings, discloses a preferred form of the invention.

BRIEF DESCRIPTION OF THE DRAWINGS

Referring now to the drawings wherein like reference numerals indicate like parts in the various views:

FIG. 4a is a schematic fixed bleed circuit;

FIG. 6 is a schematic illustration, in block diagram form, of a modified slave module;

FIG. 8 is a graphic illustration of the pressure curves for each of the chambers in the valve of FIG. 7 during operation of the skid control system.

DESCRIPTION OF THE PREFERRED EMBODIMENT

Figure 1:
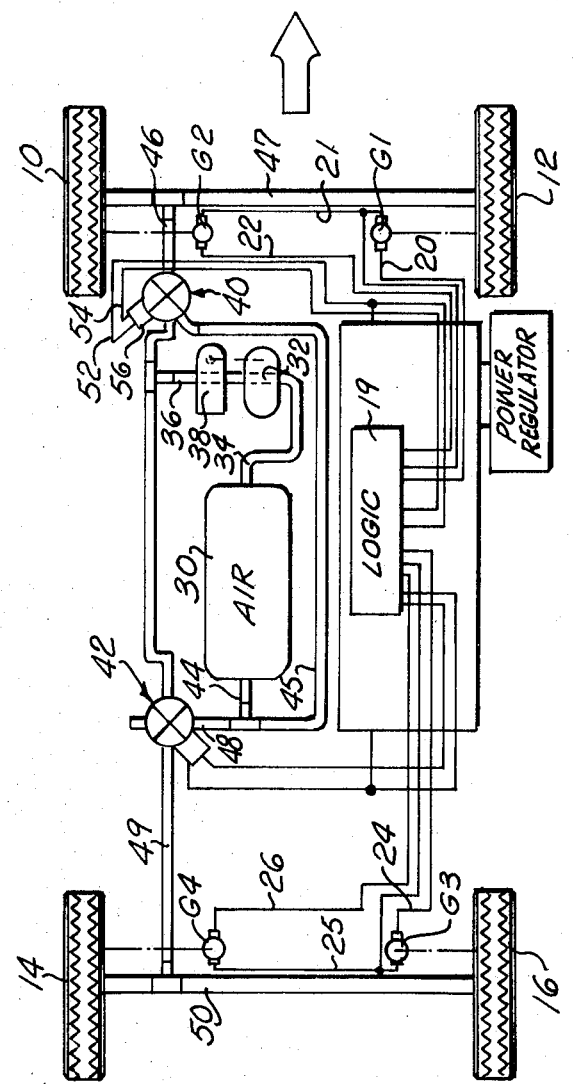
FIG. 1 is a schematic illustration of a skid control system constructed in accordance with this invention incorporated in a two axle vehicle.

Referring now more in detail to the drawings, there is schematically illustrated in FIG. 1 a truck tractor having front steer wheels 10,12 carried on a front axis or axle, and rear drive wheels 14,16 carried on a rear axis or axle. The wheels 10, 12, 14 and 16 are equipped with air brakes (not shown) which may be of conventional construction. Associated with the wheels are generators G1, G2, G3 and G4 of known construction which are driven in any conventional manner in response to rotation of their respective wheels to produce electrical signals proportional to the respective rotational wheel speed. The speed signals produced by the generators G1 and G2 are applied to a compound logic system 19 via conductors 20, 21 and 22, while the speed signals of generators of G3 and G4 are fed to the compound logic system 19 via conductors 24, 25 and 26.

The air brake system associated with the vehicle includes a high pressure air reservoir 30 connected by a conduit 34 with a conventional treadle valve 32 which is operable by an operator controlled treadle 38 to supply air pressure to a control conduit 36. The conduit 36 is in fluid communication with a pair of compensating relay valves 40, 42, the details of which will be described in greater detail hereinafter. The valves 40,42 function as relay valves during normal brake operation and, when a skid condition is encountered, as compensating skid control valves which complement the skid control provided by the logic system 19. In the relay mode of operation, the valves 40 and 42 regulate the magnitude of air pressure supplied to the brakes in proportion to the magnitude of deflection of treadle 38. The brake pressure for the front wheels 10,12 is supplied from the reservoir 30 via conduits 44, 45, valve 40 and conduits 46,47. The brake pressure applied to the brakes of wheels 14 and 16 is supplied via conduits 44, 48, valve 42, and conduits 49 and 50.

If during braking a wheel-lock condition is detected, a skid signal is generated and applied to the appropriate valve 40 or 42, which will thereafter automatically control the applied brake pressure. For example, if the logic system 19 detects an incipient wheel-lock condition related to left front wheel 12 and/or to right front wheel 14, a skid signal is generated which is applied via conductors 52,54 to energize a solenoid 56 associated with valve 40. When thus actuated, valve 40 functions to block the flow of air to the brakes of wheels 12 and 14 and vents the air in the system to atmosphere. When the skid condition has been relieved, the solenoid 56 is de-energized and brake pressure is reapplied in a manner described in more detail hereinafter.

THE COMPENSATING VALVES

Figure 7:
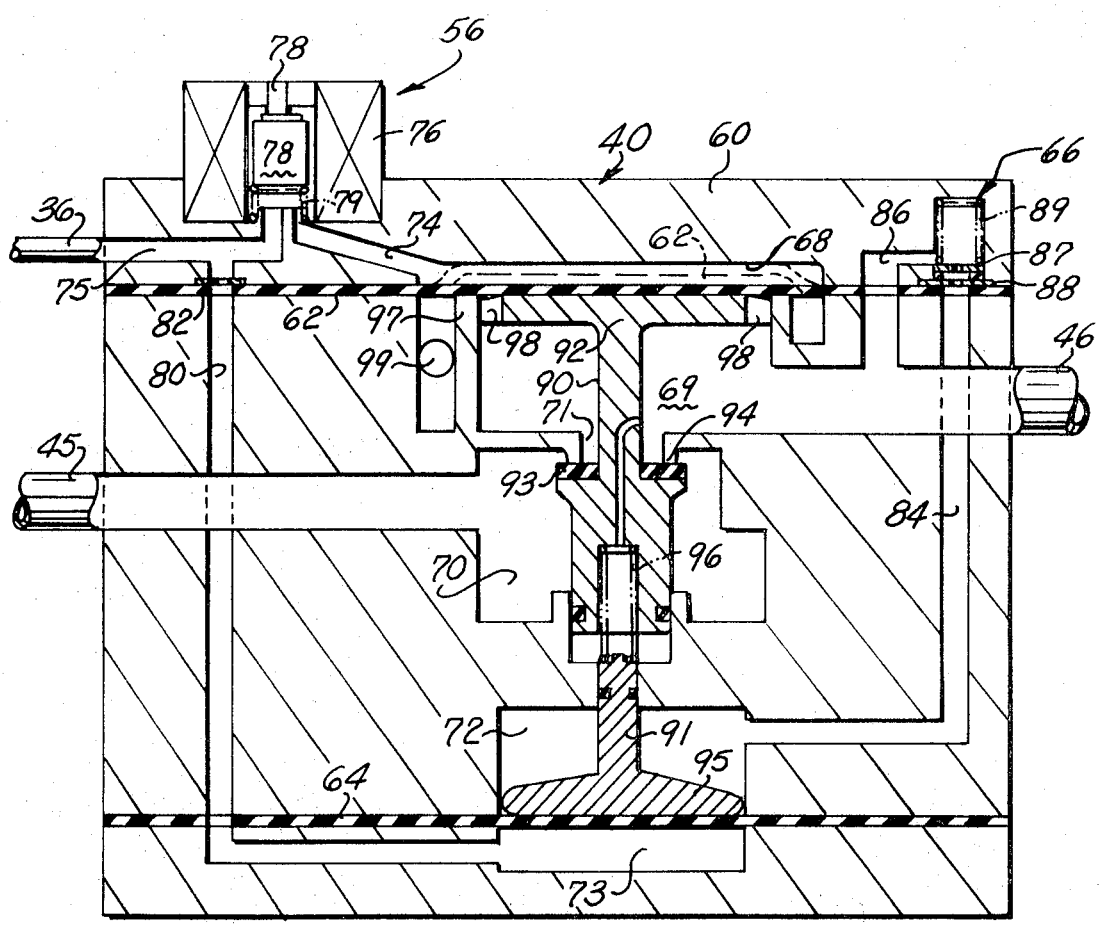
FIG. 7 is a cross-sectional view of a compensating relay valve which may be incorporated in the skid control system of FIG. 1.

The construction of the valves 40 and 42, which are identical, is illustrated in FIG. 7. The valve 40 includes a valve housing 60, a control diaphragm 62, a compensating diaphragm 64, an orifice and check valve assembly 66, and the solenoid valve 56. The valve 40 has five main chambers, namely, a control pressure chamber 68, a brake pressure chamber 69 separated from chamber 68 by the control diaphragm 62, a high pressure chamber 70 communicating with chamber 69 via a variable passage 71, a compensating chamber 72, and a biasing chamber 73 separated from the chamber 72 by the compensating diaphragm 64. The control pressure chamber 68 is in communication with the control pressure in conduit 36 via passages 74,75 and the normally open solenoid valve 56. The solenoid valve 56 includes a coil 76, an exhaust passage 77, a sliding plunger 78, and a spring 79 which normally biases the plunger 78 into a position blocking the exhaust passage 77.

The biasing chamber 73 communicates with the control pressure in the passage 75 via a passage 80 and a bias orifice 82.

The compensating chamber 72 is in communication with brake pressure chamber 69 via passage 84 and 86. The orifice check valve assembly 66 comprises a fill orifice in the form of a washer 87 and an exhaust orifice or washer 88. The opening in the exhaust orifice 88 is substantially larger than the orifice opening in the fill orifice 87 whereby fluid is admitted to chamber 72 at a rate controlled by the relatively small opening of the fill orifice 87. A spring 89 normally biases the fill orifice 87 to the position shown in FIG. 7.

The valve 40 further includes a primary piston member 90 and a secondary piston member 91. The primary piston member 90 has a disc portion 92 disposed in the chamber 69 and engageable with the diaphragm 62. The primary piston 90 further includes a valve seal 93 engageable with a valve seat 94 to control the flow of fluid pressure between chambers 69 and 70.

The secondary piston member 91 includes a disc portion 95 disposed in chamber 72 with the disc portion 95 being in engagement with the compensating diaphragm 64.

The two piston members 90 and 91 are supported coaxially with a light coil spring 96 interposed between the adjacent ends of the two pistons to bias the primary piston member upward and the secondary piston 91 downward. The effective area of the diaphragm 64 which acts against the secondary piston 91 is smaller than the effective area of the diaphragm 62 which acts against the primary piston 90.

THE COMPOUND LOGIC SYSTEM

Figure 3:
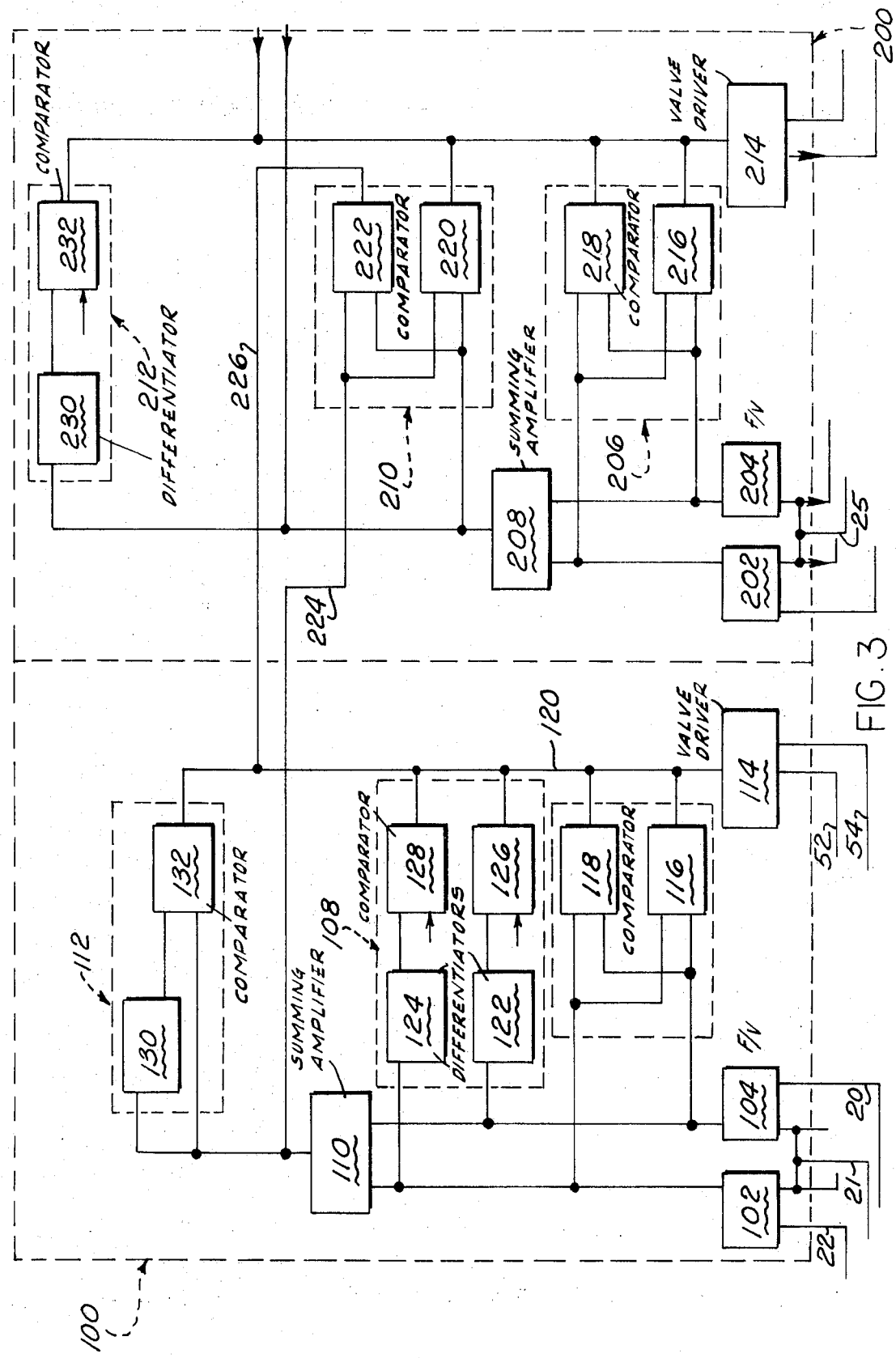
FIG. 3 illustrates in block diagram form one embodiment of the skid control system having a master module and a slave module.

Referring now to FIG. 3, one embodiment of a compound logic system 19 for a two-axle vehicle is shown in block diagram form. In this embodiment, the compound logic system 19 comprises a master logic module 100 associated primarily with the vehicle front steer wheels 10,12 and a slave logic module 200 associated primarily with the rear drive wheels 14,16. The master logic module 100 comprises a pair of frequency-to-voltage converters 102,104, a wheel speed logic circuit 106 for comparing the speed of the front wheels 10,12, a wheel deceleration logic circuit 108 for determining the deceleration of front wheels 10,12 and comparing the deceleration with a reference, a summing amplifier 110, a computed speed logic circuit 112 for comparing instantaneous axle speed with a computed axle speed based on an assumed predetermined rate of deceleration of the axle, and a valve driver 114. When a skid signal is generated by any one of the logic circuits, the signal is impressed on the valve driver 114 which energizes solenoid 56 via wires 52,54.

The slave logic module 200 comprises a pair of frequency-to-voltage converters 202,204, a wheel speed logic circuit 206 (identical to logic circuit 106), a summing amplifier 208, an axle speed logic circuit 210 for comparing the speed of the front steer axle and the rear drive axle, an axle deceleration logic circuit 212 for the rear drive axle, and a valve driver 214 for energizing the solenoid of valve 42.

Figure 2:
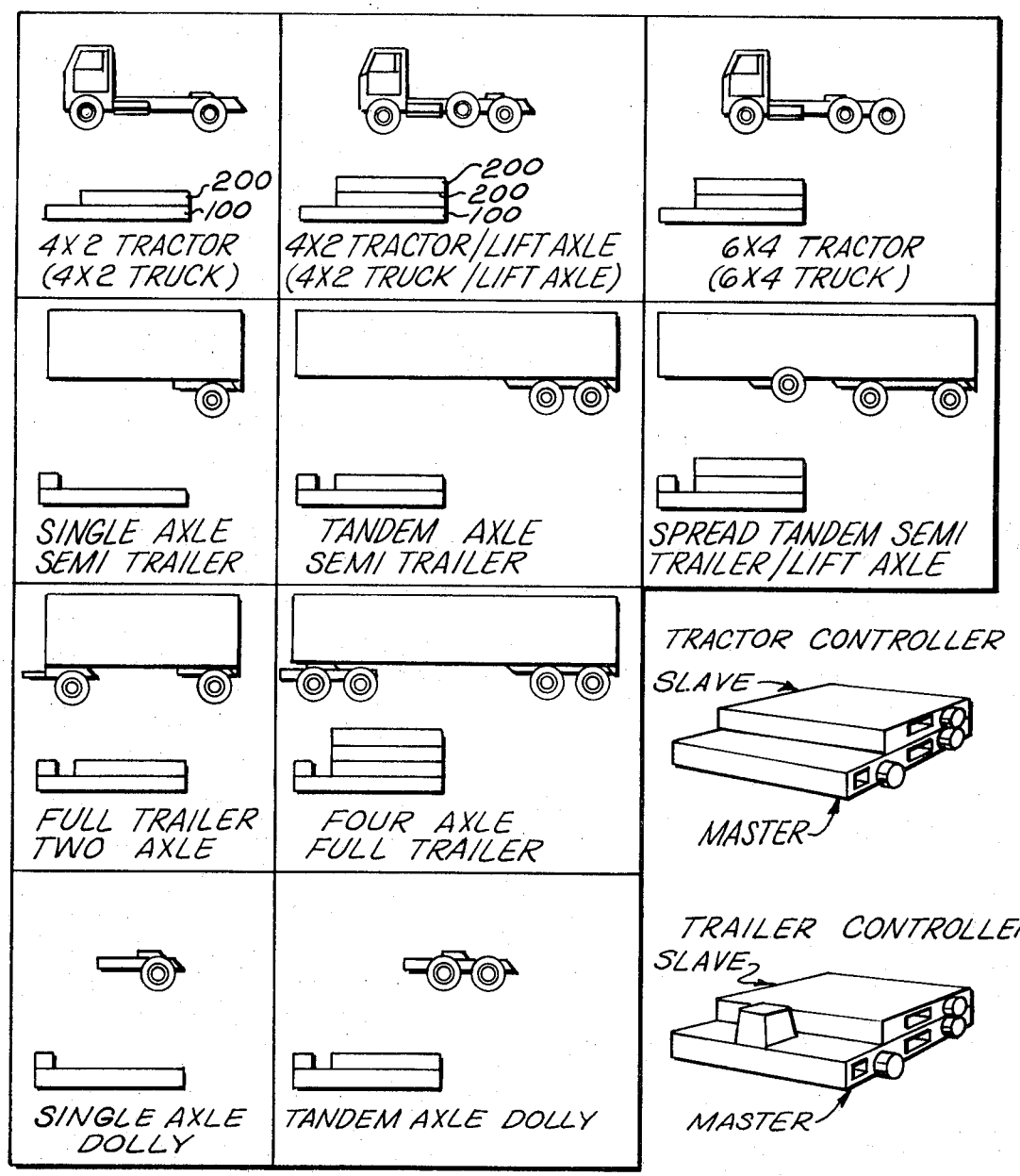
FIG. 2 is a chart illustrating the various combinations of tractor-trailer vehicles and the application of the skid control system to those vehicles.

While the compound logic system 19 has been illustrated as controlling a vehicle having two axles, this same system may be adapted to control vehicles having any number of axles simply by adding one slave logic module for each additional axle. FIG. 2 is a chart illustrating various typical types of vehicles and the makeup of the compound logic system which would be applicable for each type of vehicle. It is to be appreciated that the master logic module and the slave modules used in each of the combinations shown in FIG. 2 would be of the same construction as described in detail hereinafter.

Considering now in more detail the master logic module 100 and particularly the wheel speed logic circuit 106, the operation of that logic circuit is predicated on the probability that the wheels on a common axis will not decelerate at the same rate, due principally to differences in wheel load, brake effectiveness, and road-to-tire coefficients of friction. The wheel speed logic improves lateral vehicle stability during braking by maintaining all wheels on a common axis within a predetermined rolling speed range. The wheel speed logic circuit includes comparators 116,118, both of which receive signals from the converters 102,104. The comparators 116 and 118 function to compare the signals from the converters 102 and 104, and depending on the difference in wheel speeds, a skid control signal will be generated by one of the comparators and applied to the output line 120.

The wheel deceleration logic 108 functions to detect excessive wheel decelerations, which, if not corrected, would lead to a wheel lock-up. This logic has the ability to provide an early indication of an impending wheel lock. This circuit comprises two differentiators 122,124 and two comparators 126,128. The differentiator 122 receives a signal from the converter 104 while the differentiator 124 receives its signal from the converter 102. The two differentiators differentiate their respective input speed signals with respect to time to produce a signal which is representative of the deceleration of the associated wheel. The deceleration signals generated are compared in comparators 126,128 with a reference signal. If either comparison indicates a skid condition, a skid signal is generated and applied to the output line 120.

The computed speed logic circuit is predicated on the fact that an impending locked wheel is indicated when the actual wheel velocity is less than the computed wheel velocity, assuming a deceleration potential of the vehicle on a high coefficient surface. The circuit 112 comprises a fixed bleed circuit 130 and a comparator 132. The summing amplifier 110 receives the wheel speed signals from converters 102,104 and combines these signals to produce an output signal which is applied both to the fixed bleed circuit 130 and the comparator 132. The fixed bleed circuit stores the input signal and produces an output signal proportional to the input signal as long as the input signal is increasing, constant, or decreasing at a rate not greater than a predetermined rate. However, if the input signal decreases at a rate greater than the predetermined rate, the output of the fixed bleed circuit will decrease at a rate which maintains the output signal at a value which is a percentage of what the average axle speed signal should be based on a predetermined assumed deceleration. This output from the fixed bleed circuit 130 is applied to the comparator 132 which compares it with the signal from the summing amplifier 110 and, depending on the comparison, a skid signal will be generated and applied to the output line 120.

Figure 4:
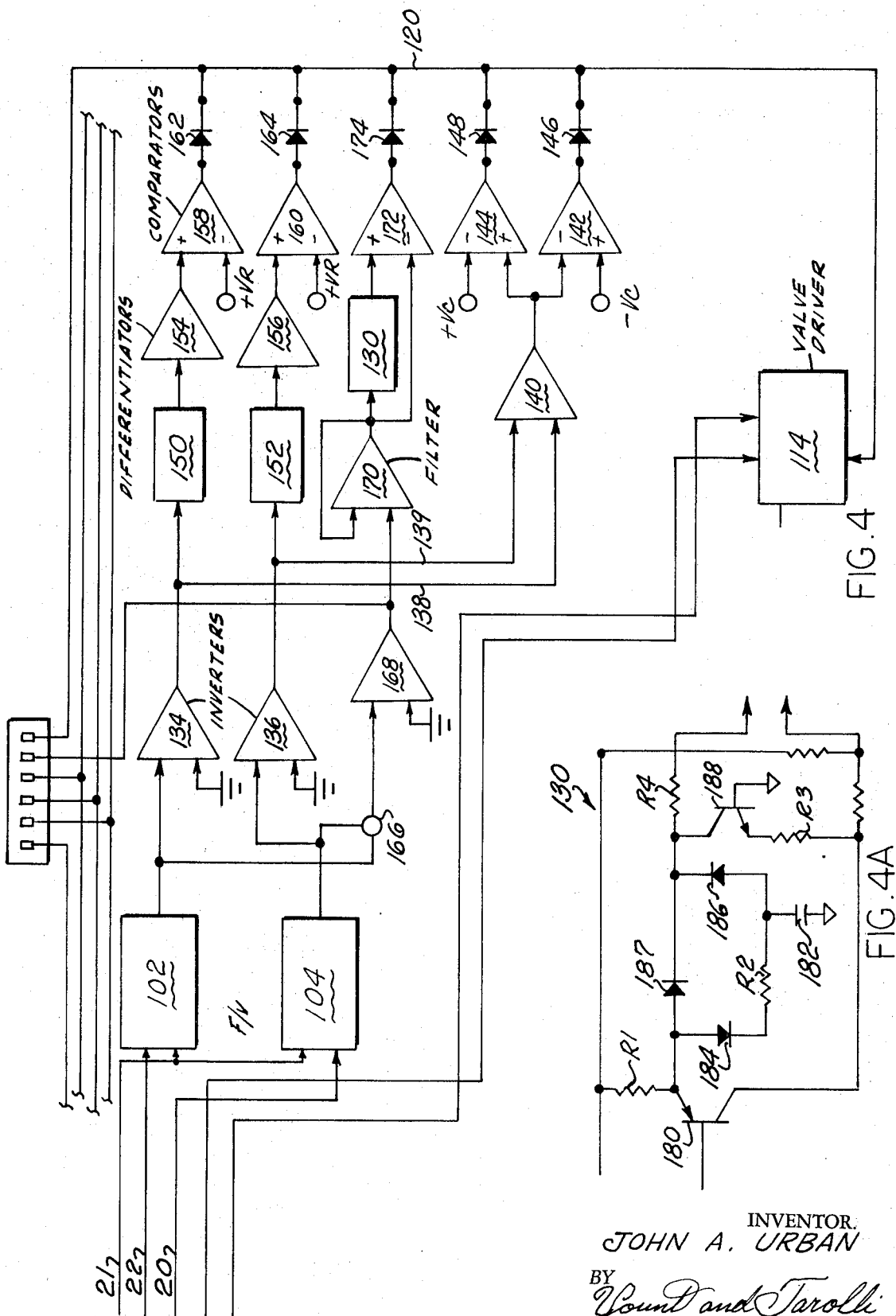
FIG. 4 is a schematic amplifier circuit for the master module of FIG. 3.

FIG. 4 illustrates an amplifier circuit which may be used for the master module 100. The DC signals generated by the generators G1,G2 are fed to the converters 102,104. The output of the left signal converter 102 is fed to an inverter 134 while the output from the right converter 104 is fed to an inverter 136 which change the signal polarity from negative to positive. From the inverters the signals are fed to the wheel speed logic circuit 106 which is embodied in the circuit of FIG. 4.

Conductors 138 and 139 apply the signals to a low gain difference amplifier 140. The difference amplifier performs a subtracting function to produce either a positive or negative output which is applied to comparators 142,144. To avoid nuisance actuation of the system resulting from differences in wheel speeds which are not a result of a skid condition, such as may result from normal braking or turning of the vehicle, a threshold value in the form of a reference voltage VC is applied to each of the comparators 142,144. The reference voltages VC represent a threshold value which must be exceeded before either comparator 142 or 144 will produce an output signal. Thus, if the output of the difference amplifier 140 is negative, and is made of a magnitude which exceeds the reference voltage VC, a positive voltage will be produced by the comparator amplifier 142 which will pass through a diode 146 to the output line 120. At the same time, the negative voltage applied to the comparator 144 will result in a negative voltage output from the comparator which is blocked by the diode 148. Conversely, if the output of the difference amplifier 140 is positive and in excess of the reference voltage VC the output of the amplifier 144 will be positive and transmitted to output line 120 while that of the amplifier 142 will be negative.

The threshold value represented by the reference voltages VC is an allowed difference between the compared speeds, which difference when exceeded is deemed to justify generation of a skid signal. This threshold value preferably varies with changes in vehicle speed so that suitable means may be employed to vary the magnitude of the reference voltage depending on the vehicle speed.

The wheel deceleration logic circuit 108 is embodied in the amplifier circuit of FIG. 4 and includes low speed cut-out devices 150,152 which render the wheel deceleration function inoperative if the input signals are below a certain predetermined level, such as 5 mph or less. Signals representative of speeds greater than 5 mph pass through the cut-outs 150,152 to a pair of differentiators 154,156 which differentiate the input speed signals with respect to time to produce a negative deceleration signal with the signal from the amplifier 154 being indicative of the deceleration of the left wheel 10 and the signal produced by the amplifier 156 being indicative of the deceleration of the right wheel 12. The signals from the differentiators 154,156 are applied to comparator amplifiers 158,160 respectively. As with the comparator amplifiers 142,144, a reference voltage VR is applied to the amplifiers 158,160 with the applied reference voltage representing a threshold value which must be exceeded at any given vehicle speed before a skid signal will be generated. This threshold value is normally selected to be greater than the vehicle deceleration obtainable on a high coefficient surface. The deceleration signal fed to the comparator amplifier 158 results in an output voltage which is proportional to the difference of the input voltages. If the comparator voltage is negative, it is blocked by the diode 162 but, if positive, the voltage passes through the diode to the output line 120. The comparator amplifier 160 operates in precisely the same manner as amplifier 158.

A threshold value of 1 g represented by the reference voltage VR has been found to provide adequate warning of incipient wheel lock conditions and adequate time to initiate corrective action before an actual wheel lock occurs. However, the threshold value may be greater or less than 1 g depending on the type of brake system and vehicle use. Moreover, the threshold value varies with respect to the speed of the vehicle so that suitable means should be employed to vary the reference voltage VR as a function of vehicle speed.

Referring now to the computed speed logic circuit 112 which is embodied in the circuit of FIG. 4, the output signals from the converters 102,104 are directed to a summing junction 166 and amplifier 168 where the outputs are summed and fed through an active low pass filter 170 to the fixed bleed circuit 130 and to the negative terminal of comparator 172. The comparator 172 is similar to each of the comparators 142, 144, 168 and 160. A suitable fixed bleed circuit 130 is shown in FIG. 4a. As shown, the speed signal from filter 170 is fed into the base of an emitter follower 180. Capacitor 182 is charged through R1, diode 184 and R2 to the emitter voltage of 180. At constant speed or during acceleration, capacitor 182 is prevented from discharging since diode 186 is reverse biased. Upon wheel deceleration, diode 186 is forward biased, diodes 184 and 187 are reverse biased and the capacitor discharges through a constant current source 188. The rate of discharge is controlled by R3 and is chosen to correspond to a predetermined deceleration. The voltage at the junction of diodes 186 and 187 decreases almost linearly, because the current drawn by resistor R4 is negligibly small in comparison with the constant current in R3. Current in R4 is therefore an approximate measure of voltage on capacitor 182, and serves to sense the voltage on the capacitor.

In the absence of the input signal decreasing at a rate greater than a predetermined rate, the fixed bleed circuit will produce an output signal which is a predetermined percentage of the input signal. As a specific example, the fixed bleed circuit may be designed to produce an output signal which is 80 percent of its input signal so long as the input signal is increasing, constant or decreasing at a rate not greater than a rate corresponding to a 0.9 g deceleration (0.9 g being the potential limit for a heavy duty truck). However, if the input signal decreases at a rate greater than a 0.9 g deceleration the circuit will maintain the output signal at a value representative of 80 percent of what the average axle speed signal should be based on a 0.9 g deceleration. Thus, during modes of operation when the average axle speed signal is increasing, constant or decreasing at a rate representative of less than a 0.0 g deceleration, the input signal to the positive terminal of the amplifier 172 will be less than the input signal to the negative terminal of the amplifier and a negative output voltage will be produced which will be blocked by the diode 174. However, for an average axle speed deceleration in excess of 0.9 g there will occur, if the deceleration time span is sufficiently long, a point where the output signal of the fixed bleed circuit 130 will equal or begin to exceed the average axle speed signal. At this point in time, the average axle speed is 20 percent below the speed it should be, based on a 0.9 g deceleration rate. As long as the signal at the positive terminal of amplifier 172 is equal to or greater than the signal at the negative terminal, the amplifier 172 will produce a positive voltage that is transferred to the output line 120.

It should be noted that each of the described skid control logic circuits is ineffective under certain braking conditions to produce a skid signal. However, it has been discovered that under virtually all braking conditions at least one of the logic circuits will be operative to produce a skid signal of the required integrity. Thus, by incorporating the individual logic circuits into a compound system with the individual circuits operating independently and in parallel, skid control is provided for the vehicle irrespective of the conditions encountered.

The following chart summarizes in tabular form the quality of the skid control signal generated by each of the individual logic circuits under various conditions of excess brake application. The portions enclosed in a solid box indicate an unacceptable signal, the portion enclosed in a dashed box represents an acceptable signal and the unboxed portions represent a desirable, high quality signal.

no skid condition occurs, the pressure in the brake pressure chamber 69 will build up to the level of the pressure in the control chamber 68 and act against the disc portion 92 of the primary piston 90 to counterbalance the pressure forces exerted by the control diaphragm threby enabling the spring 96 to return the primary piston to a closed position blocking off further flow of air to the brake pressure chamber. Upon release of the treadle, the air in the control chamber 68 will be vented back through the treadle valve 32 in a conventional manner thereby creating a pressure imbalance across the control diaphragm 62. The higher pressure in the brake pressure chamber 69 will, by openings 98, act against the underside of the diaphragm 62 to deflect it upward to the dotted line position shown in FIG. 7 and thereby move the diaphragm away from an annular

LOGIC INTEGRITY

| Excess brake application | Deceleration logic | Speed logic | Computed speed logic |
|---|---|---|---|
| Very small | A wheel can slowly decelerate to lock-up without producing a signal. | Good signal | No signal unless high rate of deceleration takes place. |
| Small | Early indication of impending lock-up gives smooth stop without lock-up. | Late indication of impending lock-up leads to momentary lock. | No signal unless high rate of deceleration takes place. With low vehicle deceleration, wheel references to high vehicle deceleration resulting in step-lock. |
| Medium | Loss of signal during wheel roll-up causes premature reapplication resulting in step-lock. | Brakes are not reapplied until wheel has rolled up to optimum speed. Maintains signal even during momentary lock-up. | Brakes are not reapplied until wheel has rolled up to computed speed which is less than optimum, resulting in step-lock. |
| Heavy | Excess brake application locks wheels before the excess air can be exhausted from the chambers. When the wheels lock, deceleration is zero and the signal disappears. | The excess application locks the wheels before the excess air can be exhausted. The speed reference will be to locking wheels causing step lock or all wheels may reach zero simultaneously resulting in loss of signal. | In the event of no other signal, the computed vehicle speed logic will release the brakes at least two cycles and in so doing, one or more of the other logics will become effective and the system will regain true vehicle reference. |
| Unloaded full treadle on ice. | Excess brake application locks wheels before the excess air can be exhausted from the chambers. When the wheels lock, deceleration is zero and the signal disappears. | The excess application locks the wheels before the excess air can be exhausted. All wheels will reach zero simultaneously resulting in loss of signal. | In the event of no other signal, the computed vehicle speed logic will release the brakes at least two cycles and in so doing, one or more of the other logics will become effective and the system may regain true vehicle reference. |

Thus, the compound logic system 19 provides a skid control system that (1) detects impending wheel lock early in the brake cycle (2) maintains a skid signal as long as the wheel speeds (or the axle speeds) differ by an amount in excess of a predetermined threshold value, and (3) maintains a skid signal long enough to insure brake release in the event that all wheels lock before the brake pressure has exhausted sufficiently to permit wheel roll-up.

OPERATION

The compound logic system 19 cooperates with the valve 40 during a typical skid control cycle in the following manner. When the brakes are initially applied by the operator depressing treadle 38, control air pressure rapidly rises in to act on the control diaphragm 62 and the primary piston 90 to move the piston 90 downwardly, unseating the valve communicating chambers 69 and 70. The high pressure air from the reservoir 30 present in the high pressure chamber 70 is communicated to the brake pressure chamber 69 and applied to actuate the brakes of the wheels 10 and 12. Assuming lip 97 to permit the brake pressure chamber 69 to be vented to an exhaust passage 99.

If, however, a skid condition is encountered as, for example, where the ideal brake pressure for the road conditions is 25 psi and the control pressure is established by the operator at 60 psi, one or both of the wheels 10, 12 will begin to decelerate to a locked condition. Upon this occurrence, one or more of the logic circuits will detect the skid or incipient skid and produce an output signal on the output line 120 which in turn energizes the solenoid 56 to pull the plunger 78 down against the bias of the spring 79 thereby venting the control chamber 69 to atmosphere through the exhaust port 77. As the control chamber pressure vents, a force difference is created across the diaphragm 62 which moves the diaphragm upwardly and allows the pressure in the brake pressure chamber 69 to vent to atmposhere through the exhaust passage 99. When the brake passage has been reduced sufficiently to allow the wheel which generated the skid signal to roll up to vehicle speed, the skid signal disappears and solenoid 56 is de-energized whereby control pressure is again admitted to control chamber 68.

At this point in the braking cycle, the compensating skid aspects of valve 40 come into play. More particularly, from the time the vehicle operator first initiated braking, pressure had been flowing to bias chamber 73 through the bias orifice 82 and passage 80. At the same time, brake pressure had been flowing to the compensating chamber 72 through the compensating fill orifice 87 and passages 84,86. The bias orifice 82 and the compensating fill orifice 87 are so sized that the pressure in the chambers 73,72 rises at substantially the same rate so that the net force on the secondary piston 91 is substantially zero during initial brake application. However, when the brake pressure chamber 69 is vented to atmosphere, a pressure differential is created across the valve assembly 66 with the higher pressure in the compensating chamber 72 acting against the fill orifice 87 to move it upward against the bias of the spring 89 thereby allowing the discharge from the compensating chamber 72 to be governed by the relatively large opening in the compensator exhaust orifice 88. At the same time, control pressure, which has been vented from the control chamber 68, continues to flow to the bias chamber 72 from passage 75 thereby creating a pressure difference across the bias diaphragm 64, moving the secondary piston 91 upward against the bias of the spring 96 into intimate contact with the primary piston 90.

When the brakes are reapplied, upon termination of the skid signal, the upward force on the secondary piston results in a brake pressure rise curve having a bend or knee as shown in the graph of FIG. 8. As shown in that graph, the brake pressure rise curve upon reapplication has a first stage rapid rise rate to a level below the ideal brake pressure level followed by a substantially slower rate of pressure rise. This characteristic knee effect obtainable with the valve 40 increases the effectiveness of the braking system by (1) allowing initial reapplication pressure to rise rapidly and unrestricted so that effective braking force is rapidly reestablished and (2) decreasing brake pressure overshoot which decreases the number of skid cycles per unit of time. Moreover, the capability of decreasing brake pressure overshoot eliminates the necessity for the compound logic system to operate, in subsequent cycles, in an excessively large brake application mode. Any subsequent skid conditions which occur as the brake pressure rise curve passes beyond the ideal brake pressure curve generates only a small excess brake application pressure and assures generation of a skid control signal of good quality.

The compound logic system cooperates with the valve 40 to continue cycling of the valve 40 in the manner illustrated in FIG. 8 until a skid condition is no longer detected and the vehicle is brought to a smooth stop.

SLAVE MODULE

Turning now to the slave logic module 200 of FIG. 3, that module cooperates with the valve 42 to control the wheels 14,16 in substantially the same manner as the master module 100 cooperates with valve 40. The wheel speed logic circuit 206 includes comparators 216,218 which function in precisely the same manner as the comparators 116,118 to compare the wheel speed signals from wheels 14 and 16 and impress a skid signal on valve driver 214 when the signals differ by an amount in excess of the threshold value.

The axle speed logic circuit 210 is predicated on the probability that all axles of a vehicle will not decelerate at the same rate, due principally to differences in axle load, brake effectiveness and road-to-tire coefficients of friction. This logic circuit includes comparators 220 and 222 with the comparator 220 receiving the summed signal from the summing amplifier 208 and, by conductor 224, a signal from the summing amplifier 110 of the master module. It will be appreciated that the summed signals from amplifiers 110 and 208 are indicative, respectively, of the average axle speed of the front and rear axles. The same two signals are also applied to the comparator 222. The comparator 222 compares the rear axle signal to the front axle signal and if the rear axle signal exceeds the front axle signal, produces an output skid control signal that is transmitted via conductor 226 to the output line 120 of the master module where it is impressed on the valve driver 114. Similarly, comparator 220 produces a skid control signal when the front axle speed exceeds the rear axle speed with the skid control signal generated by the comparator 220 being transmitted via the output 219 to the valve driver 214.

It is to be noted that the axle speed logic circuit 210 is the only logic circuit which requires a speed signal from any other module. If, in addition to the slave module 20, a second module is used to control a third axle, the second slave module would receive its axle speed signal from the slave module 200.

The axle deceleration logic circuit 212 is basically the same as the wheel deceleration logic circuit 108 of the master module differing only in that the sum of the wheel speeds are used rather than individual wheel speeds. Thus, the summed signal from the amplifier 208 is directed to a differentiating amplifier 230 which differentiates the input speed signal with respect to time to produce a deceleration signal which is representative of the deceleration of the axle. This deceleration signal is then compared in a comparator 232 to a reference signal. If the comparison indicates a skid condition, a skid signal is generated on the output line 219.

Figure 5:
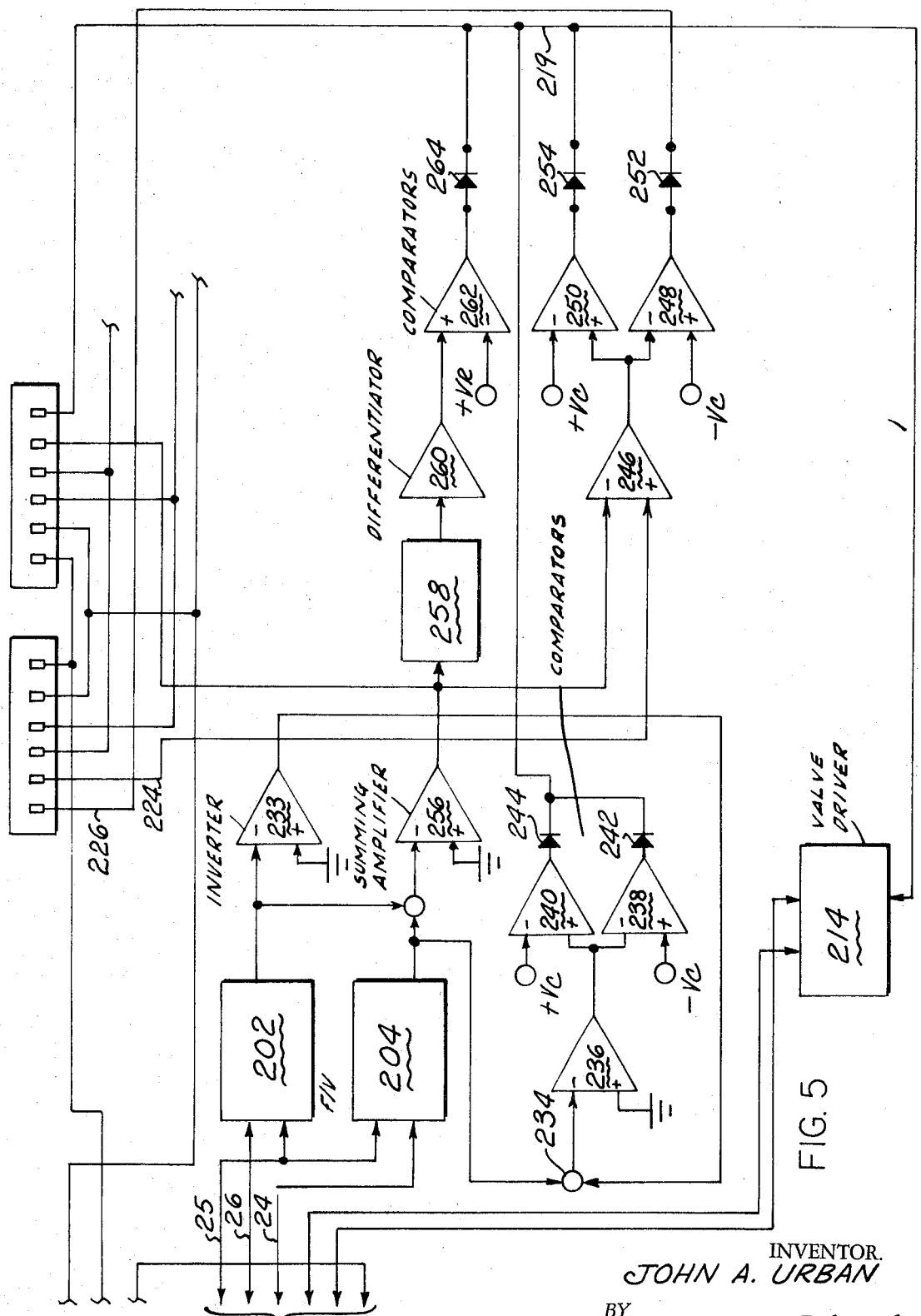
FIG. 5 is a schematic amplifier circuit for the slave module of FIG. 3.

FIG. 5 is a schematic amplifier diagram similar to the diagram of FIG. 4 and which may be used for the slave module 200. Several aspects of the slave amplifier circuit are similar both in function and construction to the master module amplifier circuit so that only that portion of the circuit which materially differs will be discussed.

The wheel speed logic circuit 206, as embodied in FIG. 5, comprises an inverter 233, a summing junction 234, a difference amplifier 236, comparator amplifiers 238,240 and a pair of blocking diodes 242,244. The signals applied to the summing junction 234 are opposite in sign so that the output will be the difference of the two signals and will have the sign of the larger. If the signals are the same magnitude, there is no output and consequently there is no output produced by the difference amplifier 236. The comparators are connected to a reference voltage VC which represents a threshold value as discussed in connection with the master module. When a negative signal is applied to the difference amplifier 236, a positive signal is produced that causes comparator 240 to produce a positive voltage which is supplied to the output line 219. When the output of the difference amplifier 236 is negative, comparator amplifier 238 produces a positive voltage which is supplied to the output line 219.

The axle speed logic circuit 210, as embodied in FIG. 5, comprises a difference amplifier 246, two comparator amplifiers 248,250 and two blocking diodes 252,254. The operation of this portion of the amplifier circuit is, in all respects, analogous to operation of the wheel speed logic circuit portion of the master module amplifier circuit.

The axle deceleration logic circuit 212, as embodied in FIG. 5, receives signals which have been summed and amplified by a summing amplifier 256. The summed signals are directed to a low speed cut-out 258 and, if greater than the set value of the cut-out, enter a differentiater 260 which differentiates the speed signals with respect to time to produce an axle deceleration signal. This deceleration signal is applied to the comparator amplifier 262 for comparison with a reference signal VC. If the output of the comparator amplifier 262 is a negative voltage, it is blocked by the blocking diode 264 but if positive, a skid control signal is applied to the output line 219.

MODIFIED SLAVE MODULE

FIG. 6 illustrates a modified slave logic module in which a computed speed change logic circuit 270 has been added to the wheel speed logic circuit 206, axle speed logic circuit 210 and axle deceleration logic circuit 212. Logic circuit 270 includes a fixed bleed circuit 272 and a comparator amplifier 274. This logic circuit is structurally and functionally the same as logic circuit 112 of the master logic module and adds to the slave logic the ability to maintain directly a skid signal during large excessive brake application pressure long enough to insure that the slave controlled axle brakes release in the event that the wheels lock before the brake pressure has exhausted sufficiently to allow wheel roll-up.

While the invention has been described with particular reference to specific embodiment, neither the illustrated embodiments nor the terminology employed in describing them is intended to be limiting; rather, it is intended to be limited only by the scope of the appended claims.

Having thus described the invention, what is claimed is:

1. An anti-skid control system for a vehicle having first and second brake equipped independently rotatable wheels on a common axis, said system comprising:
    valve means for applying said releasing fluid forces to the brakes,
    first means operative during application of said brakes to generate a skid signal when the difference between the rotational speeds of said wheels exceeds a predetermined amount,
    second means operative during application of said brakes to generate a skid signal when the deceleration of either of said wheels exceeds a predetermined deceleration,
    means responsive to a skid signal from either of said first and second means for actuating said valve means to relieve the brakes associated with both of said wheels,
    third means operative during application of said brakes to generate a skid signal for actuating said valve means to release the brakes associated with both of said wheels when the average rotational speed of said wheels differs from a reference speed,
    said vehicle including third and fourth independently rotatable brake equipped wheels mounted in spaced relation on a second common axis spaced from the first axis,
    valve means operative to apply and release fluid forces to the brakes of said third and fourth wheels,
    four means for producing a skid signal for actuating said valve means associated with the wheels of one of said axes when the average wheel speeds on said one of said axes is less than the average wheel speeds on the other of said axes by a predetermined amount, and
    fifth logic means for producing a skid signal when the average deceleration of said wheels on said second axis exceeds a predetermined deceleration value.

2. The skid control system of claim 1 and further including means for producing from the wheel speeds of the wheels on said second axis a computed reference speed signal representative of wheel speed during a predetermined deceleration, and
    sixth logic means for producing a skid signal when the average wheel speed of said wheels on said second axis differs from said computed reference speed.

3. The skid control system of claim 1 and further including means operative to produce a skid signal when the difference between the rotational speeds of said third and fourth wheels exceeds a predetermined amount.

4. A brake control system for a vehicle having a plurality of brake equipped wheels mounted in spaced relation for rotation about a common axis, said system comprising,
    valve means for applying fluid forces to actuate said brakes under the control of an operator and for relieving said brake forces in response to a skid signal,
    signal generating means associated with each of said wheels to generate signals representative of the speed of each wheel,
    first logic means operative to generate a skid signal when said two wheel speed signals differ by a predetermined amount,
    second logic means operative to receive said speed signals and to generate a skid signal when the deceleration of either wheel exceeds a predetermined deceleration,
    third logic means operative to receive said wheel speed signals and to generate a skid signal when the wheel speed signal decreases below a computed reference speed, and
    circuit means interconnecting said logic means with said valve means whereby a skid signal generated by any of said logic means is operative to actuate said valve means to relieve the brakes to all of said wheels.

5. The brake control system of claim 4 wherein said valve means includes means for restricting the reapplication of fluid forces upon removal of a skid signal to an initial rapid rise in fluid forces followed by a subsequent slower rise in fluid forces.

6. An anti-skid control system for a vehicle having first and second brake equipped independently rotatable wheels on a common axis, said system comprising:
    valve means for applying and releasing fluid forces to the brakes,
    first means operative during application of said brakes to generate a skid signal when the difference between the rotatational speeds of said wheels exceeds a predetermined amount, second means operative during application of said brakes to generate a skid signal when the deceleration of either of said wheels exceeds a predetermined decleration, and means responsive to a skid signal from either of said first and second means for actuating said valve means to relieve the brakes associated with both of said wheels, generating means associated with said first and second wheels for producing first and second signal representative respectively of said first and second wheel speeds, means for providing from said first and second speed signals an average wheel speed signal having a magnitude representative of the average speed of said first and second wheels, reference signal means for producing a computed reference speed signal and which comprises means for receiving said average wheel speed signal and producing a reference signal which decreases in magnitude at a predetermined decay rate from an initial value representative of wheel speed, and means for comparing said average wheel speed signal with said computed reference speed signal and providing a skid signal whenever the magnitude of the average signal is less than that of said reference signal.

7. An anti-skid control system for use with a vehicle having at least first and second spaced apart, independently rotatable wheels which rotate on a common axis with each of said wheels being equipped with fluid operated brakes and a braking system for applying fluid forces to each of said brakes, said braking system including vehicle operator control means for controlling the application of fluid forces to the brakes and relay valve means actuated by said operator control means for applying or releasing fluid forces simultaneously to each of the brakes, said skid control system comprising:

generating means associated with said first and second wheels for producing first and second signal representative respectively of said first and second wheel speeds, means for providing from said first and second speed signals an average wheel speed signal having a magnitude representative of the average speed of said first and second wheels, reference signal means for producing a computed reference speed signal and which comprises means for receiving a speed signal from the wheels on said axis and producing a reference signal which decreases in magnitude at a predetermined decay rate from an initial value representative of wheel speed, first means for comparing said average wheel speed signal with said computed reference speed signal and providing a skid signal whenever the magnitude of the average signal is less than that of said reference signal, second means for providing a skid signal when the deceleration of at least one of said wheels differs from a reference value, and means responsive to a skid signal from either of said first and second means for actuating said relay valve to relieve the fluid pressure applied to the brakes at both of said wheels.

* * * * *